Oct. 5, 1937.  E. H. BANCKER ET AL  2,095,117
SUPERVISION OF ELECTRIC SYSTEMS
Original Filed June 22, 1935
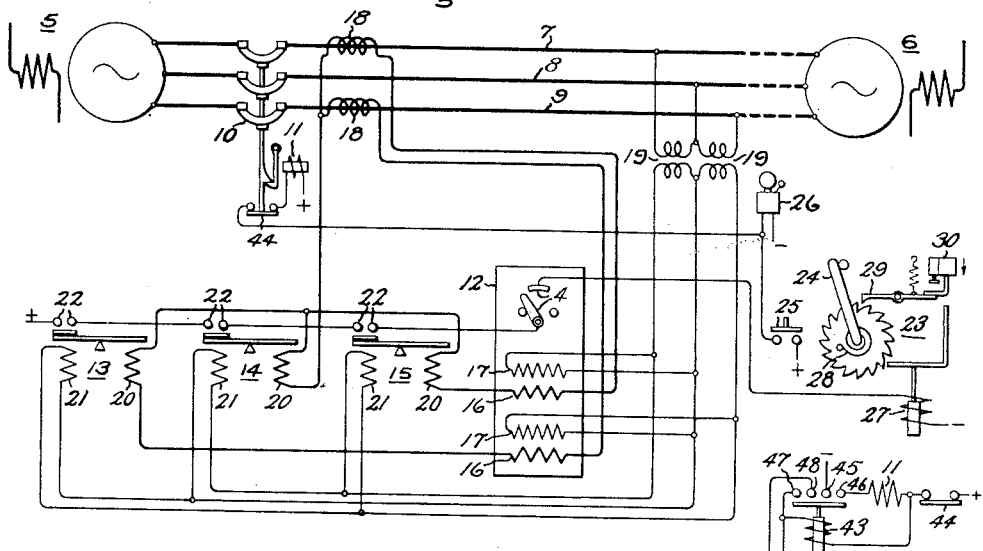
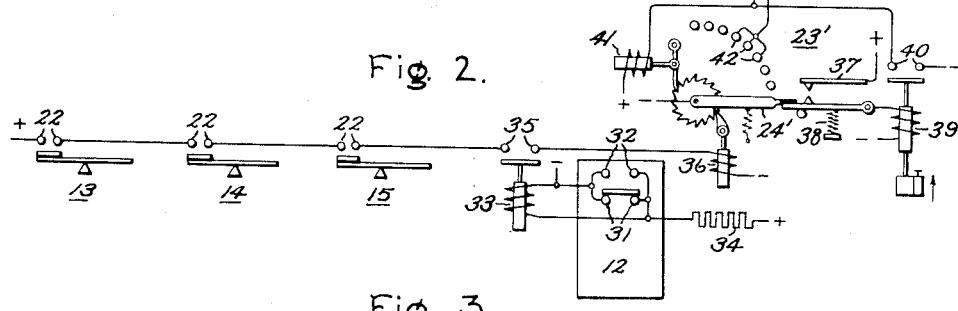
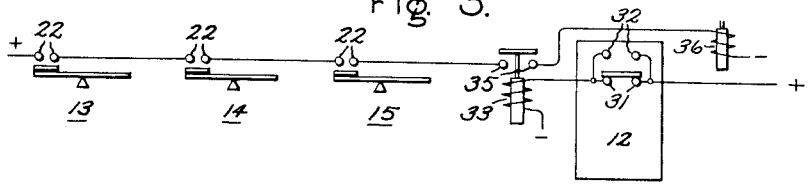
Inventors:
Elbert H. Bancker,
Roy C. Buell,
by Harry E. Dunham
Their Attorney.

Patented Oct. 5, 1937

2,095,117

UNITED STATES PATENT OFFICE 2,095,117

SUPERVISION OF ELECTRIC SYSTEMS

Elbert H. Bancker and Roy C. Buell, Schenectady, N. Y., assignors to General Electric Company, a corporation of New York Application June 22, 1935, Serial No. 27,963
Renewed May 12, 1937

20 Claims. (Cl. 175—294)

Our invention relates to improvements in the supervision of electric systems and more particularly alternating-current electric systems. An object of our invention is to provide improved means for detecting a sustained asynchronous condition of an alternating-current electric system. Another object of our invention is to provide an improved detecting means which discriminates between faults and out-of-step conditions. A further object of our invention is to provide means for quickly breaking the continuity of such a condition in order to avoid the troubles associated with instability. These and other objects of our invention will appear in more detail hereinafter.

Faults on an alternating-current electric system have been known to cause synchronous machinery to fall out-of-step and thereby to produce such unstable voltage and current conditions in sound portions of the system as to cause false operation of the fault responsive protective relays and the circuit breakers controlled thereby on the sound portions. Obviously, such false operation must be avoided because loads are likely to be left without any source of power. It is therefore desirable, on the occurrence of out-of-step conditions, to subdivide the system, disconnect generators or remove the field therefrom in such a way as to eliminate the out-of-step condition, but no load is to be left without a source of power. For subdividing the system, points may be chosen at which there is no exchange of power.

Our invention will be better understood from the following description when considered in connection with the accompanying drawing, and its scope will be pointed out in the appended claims.

In the accompanying drawing, Fig. 1 illustrates diagrammatically an embodiment of our invention as applied to a polyphase alternating-current electric system; Fig. 2 illustrates diagrammatically another embodiment of our invention; and Fig. 3 illustrates diagrammatically a modification of a part of the embodiment of our invention shown in Fig. 2.

In Fig. 1, we have illustrated our invention as embodied in a polyphase alternating-current electric system shown schematically and simply as comprising two synchronous dynamo-electric machines 5 and 6, which are interconnected by a tie line comprising phase conductors 7, 8, 9. The balance of the system network and apparatus, such as feeders, transformers and other devices, have been omitted for the sake of simplicity in illustration. For subdividing the system, there may be provided suitable means, illustrated as a latched-closed circuit breaker 10, which is provided with a trip coil 11.

When the machines 5 and 6 become asynchronous, the power transfer between these machines over the line 7, 8, 9 reverses twice for each electrical revolution of one machine relatively to the other. Since the system impedance is mostly inductance, one of these reversals is at the instant of maximum current flow when the electromotive forces of the machines are displaced substantially 180° in phase relation, and the other is at the time of minimum current flow when the electromotive forces are substantially in phase. The latter reversal may also occur during oscillations of the type which become damped more or less quickly without producing out-of-step conditions. The actual phase displacement angles at which these reversals occur may differ somewhat from zero degrees and 180°, depending on the natural angle of the system; that is, $$\tan^{-1}\frac{X}{R}$$

where X is the total reactance and R the total resistance from end to end, including the machines.

In accordance with our invention, we provide detecting means which functions on the basis of the reversal of power under the maximum current condition. To this end we provide a power directional relay means 12, which is connected to be energized responsively to current and voltage conditions of the system, and means, such as one or more relays 13, 14, 15, connected to be energized responsively to current conditions of the system. The power directional relay 12 is shown as of the wattmeter type having current and voltage windings 16 and 17, respectively, which are respectively connected to be energized from the current transformers 18 and the potential transformers 19. The relay 12 is also provided with a passing contact arrangement such that its contacts 4 are normally open but close momentarily whenever a power reversal occurs. The torque characteristic of the power directional relay may be $$T = \Sigma EI \cos\left(\theta - \cot^{-1}\frac{X}{R}\right)$$

where refinement is desired, but for most practical applications a power directional relay having a true wattmeter torque $T = \Sigma EI \cos \theta$ should be satisfactory. The current responsive relays 13, 14, and 15 may be simple overcurrent relays but in order to obtain a response which is independent of the line load conditions, the relays 13, 14, and 15 are preferably of the so-called impedance responsive type having current windings 20 and voltage windings 21, respectively, connected to be energized from the current transformers 18 and the potential transformers 19. Inasmuch as an asynchronous condition affects all phases alike, it is preferable, although not necessary, to have one of these relays per phase, in order to obtain differentiation between asynchronous conditions and faults. This differentiation holds for all but balanced three-phase faults which affect all phases alike. For this differentiation, the relays 13, 14, and 15 are arranged so that their control is dependent on their joint operation, for example, their contacts 22 may be arranged in series in a control circuit as shown.

Obviously, when a fault such as a short circuit occurs, one or more of the abnormal current condition relays 13, 14, 15 will operate, and the power directional relay 12 will or will not make a passing contact, depending upon whether or not the fault is so located as to cause a change in the direction of flow of power. If the power flow was reversed by the fault, then when the fault is cleared, a return to the original direction of the power flow occurs. Thus, the power directional relay 12 may make no passing contacts or two passing contacts. Obviously, if the abnormal current condition detecting relay or relays have their contacts closed, as during the fault or after the fault because of swings, there would result no discrimination between faults and out-of-step conditions. Subsequent oscillations causing power reversals would not result in the closing of the circuit through the contacts of the abnormal current condition relays and the contacts of the power directional relay because at the time the power directional relay makes its contact the current will be at a minimum and the contacts of the abnormal current condition relays will be open. In other words, the abnormal current condition relays and the power directional relay alone provide discrimination between a fault or an out-of-step condition and an oscillating condition, but they do not provide complete discrimination between a fault and an out-of-step condition.

In order to provide such complete discrimination, when necessary, we place under the joint control of the abnormal current condition relays 13, 14, 15 and the power directional relay 12 a cumulative action means illustrated in Fig. 1 as a notching relay 23 of a type well known to the art. This relay is arranged through its controlling member 24 to control a device, such as a switch 25, which may in turn, as shown, control the circuit of the trip coil 11 if it is desired to trip the circuit breaker 10 automatically on the occurrence of an asynchronous condition, or the circuit of an indicating device such as a bell alarm 26. The relay 23 is effective only after a predetermined number of actions to operate the switch 25. In other words, the operation of the relay 23 is such that when its winding 27, which is under the joint control of the abnormal current condition relays and the power directional relay, is energized a predetermined number of times, the controlling member 24 is turned counterclockwise against the bias of the spring 28 far enough to operate the switch 25. The return of the member 24 under the bias of the spring 28 between the successive energizations of the winding 27 is prevented by the pawl 29. If less than the predetermined number of actuations occur in a predetermined time, a time delay means, such as the dashpot 30, releases the pawl 29 and permits the return of the member 24 under the bias of its spring 28 to the initial position shown.

Now, if an asynchronous condition occurs, it will affect all the phases alike, and since a power reversal occurs at the time of the maximum current condition of the power swing, the abnormal current condition relays 13, 14, and 15, will have their contacts closed simultaneously when the passing contact of the power directional relay is made as the power reverses. Three successive reversals of power will consequently effect the corresponding number of energizations of the winding 27 of the cumulative action relay 23, and thereby cause the closing of the switch 25. The number of actions which the cumulative action means must make before completing its operation is not limited to three but may be three or more because, as previously pointed out, it may undergo two successive actions under fault conditions which are not necessarily coexistent with out-of-step conditions.

Practically complete discrimination may be obtained without the use of the cumulative action means 23 because the power directional relay 12 and the abnormal current condition relays 13, 14, and 15 discriminate between out-of-step conditions and all kinds of faults except a fault which involves all phase conductors and which changes the original direction of power flow. Since faults involving all phase conductors occur very infrequently and the probability is that only half of them would result in a change in the direction of power flow, it will be apparent that the power directional relay 12 and the abnormal current condition relays 13, 14, and 15 together provide practically complete discrimination for systems where an occasional opening of the tie circuit breaker on other than out-of-step conditions would cause no serious interruption in the continuity of service.

In the embodiment of our invention shown in Fig. 2, there are illustrated merely the control devices and circuits since the connections of the relays responsive to circuit conditions may be as shown in Fig. 1. The power directional relay is illustrated as of the double throw type, with contacts 31 and 32, one set or the other of which is normally closed, depending on the direction of power. When either set is closed, the auxiliary relay 33 is deenergized, for example, by being short-circuited. A current limiting resistor 34 is provided to prevent a short-circuit on the energizing source of the relay 33 while the relay contacts 31 or 32 are closed. When a power reversal occurs, both of the contacts 31 and 32 are momentarily open and the auxiliary relay 33 is energized to close its contacts 35. If at the same time the abnormal current condition relays 13, 14, 15 have their contacts 22 closed, the energizing winding 36 of the cumulative action means 23' is energized. This cumulative action means, although generally of the notching type, is well known to the art and differs from that shown in Fig. 1 but the cumulative action means shown in Fig. 1 could be used with the relay arrangement shown in Fig. 2. On the first impulse of the controlling member 24', the auxiliary contacts 37, which are normally held open by this member are released to close under the bias of a spring 38. Upon closing, they complete the circuit for the time delay device 39, which, through its contacts 40, controls the circuit of the holding pawl releasing magnet 41. If the control member 24' is moved to engage some one of the contacts 42 before the expiration of the time action of the auxiliary relay 39, as will be the case when a sustained asynchronous condition occurs, then the circuit of the auxiliary control relay 43 is completed through the circuit breaker auxiliary switch 44, which is closed when the circuit breaker is closed and opens when the circuit breaker opens. When the relay 43 is energized, it seals itself in through its contacts 47 and 45, and closes the circuit of the trip coil 11 through its contacts 45 and 46. In order to reclose the circuit breaker and also to have the cumulative action means 23' reset and ready for operation when the circuit breaker is reclosed without awaiting the expiration of the time delay of the relay 39, the holding pawl releasing magnet 41 may be energized in the event that the control member 24' is moved enough to engage one of the contacts 42 by including in circuit with these contacts the contacts 47 and 48 of the control relay 43 through which a circuit is completed for the releasing magnet 41.

The embodiment of our invention shown in Fig. 3 is substantially similar to that shown in Fig. 2, except that the auxiliary relay 33 is normally energized through that set of the contacts 31 or 32 which is normally closed. When a power reversal occurs, the relay 33 is momentarily de-energized and drops out and closes its contacts 35.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States, is:

1. In combination, an alternating current electric system and means for determining a sustained asynchronous condition of the system including a device to be operated, cumulative action means effective only after a predetermined number of actions to operate said device, and means for actuating said cumulative action means including means connected to be energized responsively to system current conditions and cooperating power directional responsive means connected to be energized responsively to system current and voltage conditions.

2. In combination, a polyphase alternating current electric system and means for determining a sustained asynchronous condition of the system including a device to be operated, cumulative action means effective only after a predetermined number of actions to operate said device, and means jointly operative to cause the actuation of said cumulative action means including means respectively connected to be energized responsively to the currents in the phase conductors of the system, and power directional responsive means connected to be energized responsively to system current and voltage conditions.

3. In combination, an alternating current electric system and means for determining a sustained asynchronous condition of the system including a device to be operated, cumulative action means effective only after a predetermined number of actions to operate said device, means for actuating said cumulative action means including means connected to be energized responsively to system current conditions and cooperating power directional responsive means connected to be energized responsively to system current and voltage conditions, and means for canceling the effect of the actions of said cumulative action means when less than said number of actions occurs in a predetermined time.

4. In combination, a polyphase alternating current electric system and means for determining a sustained asynchronous condition of the system including a device to be operated, cumulative action means effective only after a predetermined number of energizations within a predetermined time to operate said device and means for effecting the energization of said cumulative action means including an energizing circuit and a plurality of relays respectively connected to be energized responsively to the currents in the phase conductors of the system and a power directional relay connected to be energized responsively to system current and voltage conditions, each of said relays having contacts connected in series in said circuit.

5. In combination, an alternating current electric system and means for determining a sustained asynchronous condition of the system including a device to be operated, cumulative action means effective only after a predetermined number of actions to operate said device, and means jointly operative on the occurrence of sustained asynchronous conditions for effecting the energization of said cumulative action means including impedance responsive relay means connected to be energized in accordance with current and voltage conditions of the system and power directional relay means connected to be energized responsively to system current and voltage conditions.

6. In combination, an electric system, means for subdividing said system on the occurrence of a sustained asynchronous condition between a voltage at one point of the system and a corresponding voltage at another point of the system including circuit interrupting means connected in said system, means for controlling the opening of said circuit interrupting means including cumulative action means effective only after a predetermined number of actions to cause the opening of said circuit interrupting means, and means for actuating said cumulative action means including means connected to be energized responsively to system current conditions and cooperating power directional responsive means connected to be energized responsively to system current and voltage conditions.

7. In combination, an electric system, means for subdividing said system on the occurrence of a sustained asynchronous condition between a voltage at one point of the system and a corresponding voltage at another point of the system including circuit interrupting means connected in said system and means for controlling the opening of said circuit interrupting means including cumulative action means effective only after a predetermined number of actions to cause the opening of said circuit interrupting means, means for actuating said cumulative action means including means connected to be energized responsively to system current conditions and cooperating power directional responsive means connected to be energized responsively to system current and voltage conditions, and means for canceling the effect of said cumulative action means when less than said number of actions occurs in a predetermined time whereby to prevent the opening of said circuit interrupting means.

8. In combination, an alternating current electric system and means for determining a sustained asynchronous condition of the system including a device to be operated, cumulative action means effective only after a predetermined number of actions to operate said device, means for actuating said cumulative action means including means connected to be energized responsively to system current conditions and cooperating power directional responsive means connected to be energized responsively to system current and voltage conditions, and means for restoring said cumulative action means to its initial condition.

9. In combination, an alternating current electric system and means for determining a sustained asynchronous condition of the system including a device to be operated, cumulative action means effective only after a predetermined number of actions to operate said device, means for actuating said cumulative action means including means connected to be energized responsively to system current conditions and cooperating power directional responsive means connected to be energized responsively to system current and voltage conditions, means for canceling the effect of the actions of said cumulative action means when less than said number of actions occurs in a predetermined time, and means for restoring said cumulative action means to its initial condition substantially immediately after said predetermined number of actions has occurred in less than said predetermined time.

10. In combination, an alternating current electric system and means for determining a sustained asynchronous condition of the system including a device to be operated, and means for effecting the operation of said device after a predetermined plurality of power reversals within a predetermined time including means responsive to asynchronous conditions of the system connected to be energized therefrom and power directional responsive means connected to be energized responsively to current and voltage conditions of the system.

11. In combination, an alternating current electric system and means for determining a sustained asynchronous condition of the system including a device to be operated and means for controlling the operation of said device including means responsive to asynchronous conditions of the system connected to be energized therefrom, power directional responsive means connected to be energized responsively to current and voltage conditions of the system, and means controlled by said asynchronous condition and power directional responsive means for effecting the operation of said device under asynchronous conditions after a plurality of power reversals within a predetermined time.

12. In combination, an alternating current electric system and means for determining a sustained asynchronous condition of the system including a device to be operated and means forming a part of said first-named means dependent upon a predetermined plurality of power reversals in a predetermined time for effecting the operation of said device.

13. In combination, a polyphase alternating current system, and means for distinguishing between an asynchronous condition of the system and all faults except a fault which involves all phase conductors and which changes the original direction of power flow including a device to be operated and means forming a part of said first-named means and connected to be energized from the system for effecting the operation of said device only on the occurrence of a reversal of power accompanied by abnormal current conditions in all phase conductors of the system.

14. In combination, an alternating current system, and means for distinguishing between an asynchronous condition of the system and all faults except a fault involving all phase conductors and accompanied by a reversal in direction of power flow including a plurality of means respectively connected to be energized in accordance with the currents in a plurality of phase conductors of the system, power directional means connected to be energized in accordance with system current and voltage conditions, and means responsive to the simultaneous action of all of said current energized means and said power directional means.

15. In combination, an alternating current system, and means for distinguishing between an asynchronous condition of the system and all faults except a fault involving all phase conductors and accompanied by a reversal in direction of power flow including a control circuit comprising a plurality of contacts in series relation with each other, means for actuating a plurality of said contacts to circuit controlling position in dependence on the respective currents in a plurality of phase conductors of the system, and means for actuating another of said contacts to circuit controlling position on the occurrence of a reversal of power at a point in the system.

16. In combination, an alternating current system, and means for distinguishing between an asynchronous condition of the system and all faults except a fault involving all phase conductors and accompanied by a reversal in direction of power flow including a plurality of relays respectively connected to be energized in accordance with the currents in the phase conductors of the system, a power directional relay connected to be energized in accordance with system current and voltage conditions, and a control circuit including the contacts of all of said relays in series relation with each other.

17. In combination, a polyphase alternating current system, and means for distinguishing between an asynchronous condition of the system and all faults except a fault which involves all phase conductors including a device to be operated and means forming a part of said first-named means and connected to be energized from the system for effecting the operation of said device in dependence on the direction of flow of system power only when accompanied by abnormal current conditions in all phase conductors of the system.

18. In combination, an alternating current system, and means responsive to an asynchronous condition of the system including power directional means arranged for operation in dependence on the direction of flow of system power, means controlled in dependence on abnormal current conditions of the system only when all phase conductors of the system are involved, and means controlled jointly by said power directional means and said current dependent means.

19. In combination, a polyphase alternating current system, and means for distinguishing between an asynchronous condition of the system and faults on the system including a device to be operated, and means forming a part of said first-named means and connected to be energized from the system for effecting the same operation of said device only on the occurrence of a change in the direction of power flow during an abnormal current condition of the system.

20. In combination, an alternating current system, means responsive to each change in the direction of power flow in said system, means responsive to a predetermined overcurrent condition of said system, a device to be operated, and means controlled by said power directional means and said overcurrent responsive means for effecting the same operation of said device each time a change in the direction of power flow occurs during the existence of said predetermined overcurrent condition.

ELBERT H. BANCKER.
ROY C. BUELL.